US009582186B2

(12) United States Patent
Kuo et al.

(10) Patent No.: US 9,582,186 B2
(45) Date of Patent: Feb. 28, 2017

(54) SIGNATURE VERIFICATION BETWEEN A MOBILE DEVICE AND A COMPUTING DEVICE

(71) Applicant: MediaTek Inc., Hsin-Chu (TW)

(72) Inventors: Chung-Jen Kuo, Hsin-Chu (TW);
Yuan-Hsiu Chang, Zhongli (TW);
Po-An Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/533,287

(22) Filed: Nov. 5, 2014

(65) Prior Publication Data

US 2015/0177978 A1 Jun. 25, 2015

Related U.S. Application Data

(60) Provisional application No. 61/918,768, filed on Dec. 20, 2013.

(51) Int. Cl.
| G06F 3/041 | (2006.01) |
| G06F 3/0488 | (2013.01) |
| G06F 3/044 | (2006.01) |
| G06F 21/35 | (2013.01) |
| G06F 21/82 | (2013.01) |
| H04W 12/06 | (2009.01) |

(52) U.S. Cl.
CPC .......... *G06F 3/04883* (2013.01); *G06F 3/041* (2013.01); *G06F 3/044* (2013.01); *G06F 21/35* (2013.01); *G06F 21/82* (2013.01); *H04W 12/06* (2013.01)

(58) Field of Classification Search
CPC ...... G06F 3/041; G06F 3/044; G06F 3/04883; G06F 21/35; G06F 21/82; H04W 12/06
USPC .............. 345/156–184; 463/20, 29; 705/400; 709/203
See application file for complete search history.

(56) References Cited

U.S. PATENT DOCUMENTS

| 5,996,080 | A | * | 11/1999 | Silva | ...................... | G06F 1/1626 |
| | | | | | | 345/169 |
| 6,091,835 | A | * | 7/2000 | Smithies | ............ | G06K 9/00154 |
| | | | | | | 340/5.86 |
| 6,307,955 | B1 | * | 10/2001 | Zank | .................. | G06K 9/00154 |
| | | | | | | 380/30 |
| 6,618,504 | B1 | * | 9/2003 | Yoshino | ............. | G06K 9/00449 |
| | | | | | | 178/18.01 |
| 8,073,424 | B2 | * | 12/2011 | Sun | ...................... | G06Q 20/085 |
| | | | | | | 455/406 |

(Continued)

FOREIGN PATENT DOCUMENTS

EP 2 350 911 4/2010

*Primary Examiner* — Prabodh M Dharia
(74) *Attorney, Agent, or Firm* — McClure, Qualey & Rodack, LLP

(57) ABSTRACT

A non-transitory computer readable storage medium is provided. The non-transitory computer readable storage medium has stored therein instructions, which when executed by a mobile device, cause the mobile device to: provide, at a processing circuit, a signal to a transmitting electrode of a first touch panel; transmit, at the transmitting electrode, the signal to a receiving electrode of a second touch panel of a computing device; and perform further operation with the computing device when the signal corresponds to a signature stored in the computing device.

12 Claims, 5 Drawing Sheets

(56) References Cited

U.S. PATENT DOCUMENTS

| | | | |
|---|---|---|---|
| 8,259,078 B2* | 9/2012 | Hotelling | G02F 1/13338 345/156 |
| 8,376,854 B2* | 2/2013 | Ketabdar | A63F 13/06 345/156 |
| 8,624,872 B2* | 1/2014 | Shih | G06F 3/0416 345/173 |
| 9,116,652 B2* | 8/2015 | Yun | H04W 64/00 |
| 9,250,847 B2* | 2/2016 | Yun | G06F 3/1438 |
| 9,276,918 B2* | 3/2016 | Araki | H04L 63/08 |
| 2005/0102520 A1* | 5/2005 | Baxter | G06F 21/64 713/176 |
| 2005/0257255 A1* | 11/2005 | Quick | H04L 9/3271 726/9 |
| 2008/0005579 A1* | 1/2008 | Gaines | G06F 21/32 713/186 |
| 2008/0166997 A1* | 7/2008 | Sun | G06Q 20/085 455/406 |
| 2010/0073328 A1* | 3/2010 | Lynch | G06F 3/042 345/175 |
| 2010/0105429 A1* | 4/2010 | Koitabashi | G06F 1/1616 455/556.1 |
| 2010/0141681 A1* | 6/2010 | Fujii | G09G 5/006 345/649 |
| 2010/0146253 A1* | 6/2010 | Kawamoto | A63F 13/49 713/1 |
| 2010/0191650 A1* | 7/2010 | Ramachandran | G06Q 20/042 705/45 |
| 2010/0211431 A1* | 8/2010 | Lutnick | G06Q 30/02 705/14.12 |
| 2010/0234094 A1* | 9/2010 | Gagner | G07F 17/32 463/20 |
| 2011/0141045 A1* | 6/2011 | Choi | G06F 1/1626 345/173 |
| 2011/0208657 A1* | 8/2011 | Rao | G06Q 20/105 705/67 |
| 2011/0234617 A1* | 9/2011 | Watanabe | G06F 1/3203 345/589 |
| 2011/0298726 A1* | 12/2011 | Wu | G06F 1/1632 345/173 |
| 2011/0304583 A1 | 12/2011 | Kruglick | |
| 2012/0116972 A1* | 5/2012 | Walker | G06Q 20/0425 705/44 |
| 2012/0139865 A1* | 6/2012 | Krah | G06F 3/044 345/174 |
| 2012/0311686 A1* | 12/2012 | Medina | H04L 63/0807 726/7 |
| 2013/0014248 A1* | 1/2013 | McLaughlin | H04L 63/083 726/17 |
| 2013/0085968 A1* | 4/2013 | Schultz | G06F 21/32 705/400 |
| 2013/0120291 A1 | 5/2013 | Baentsch et al. | |
| 2013/0147760 A1* | 6/2013 | Lai | H04B 5/0012 345/174 |
| 2013/0174227 A1* | 7/2013 | Araki | H04L 63/08 726/4 |
| 2013/0181951 A1* | 7/2013 | Klinghult | G06F 3/0416 345/177 |
| 2013/0205380 A1* | 8/2013 | Avni | H04L 63/0853 726/7 |
| 2013/0215042 A1* | 8/2013 | Messerschmidt | G06F 3/041 345/173 |
| 2013/0278552 A1* | 10/2013 | Kamin-Lyndgaard | G09G 5/006 345/174 |
| 2014/0028616 A1* | 1/2014 | Furutani | G06F 3/044 345/174 |
| 2014/0028619 A1* | 1/2014 | Huang | H04B 1/3827 345/174 |
| 2014/0094296 A1* | 4/2014 | Bickley | G07F 17/32 463/29 |
| 2014/0152619 A1* | 6/2014 | Hotelling | G09G 3/3648 345/174 |
| 2014/0176991 A1* | 6/2014 | Yun | H04W 64/00 358/1.15 |
| 2014/0184950 A1* | 7/2014 | Chu | G06F 3/0416 349/12 |
| 2014/0199944 A1* | 7/2014 | Ran | H04B 5/0087 455/41.1 |
| 2014/0204290 A1* | 7/2014 | Chen | G06F 3/044 349/12 |
| 2014/0210758 A1* | 7/2014 | Park | G06F 3/016 345/173 |
| 2014/0214630 A1* | 7/2014 | N | G06Q 30/06 705/27.2 |
| 2014/0218334 A1* | 8/2014 | Shibata | G06F 3/044 345/174 |
| 2014/0220892 A1* | 8/2014 | Tsai | G06F 3/044 455/41.1 |
| 2014/0229884 A1* | 8/2014 | Shimazaki | G06F 3/0484 715/773 |
| 2014/0313154 A1* | 10/2014 | Bengtsson | H04B 13/005 345/174 |
| 2014/0317499 A1* | 10/2014 | Oh | G06F 3/04815 715/702 |
| 2015/0062041 A1* | 3/2015 | Kim | G06F 3/0412 345/173 |
| 2015/0078665 A1* | 3/2015 | Wang | G06K 9/00402 382/187 |
| 2015/0088982 A1* | 3/2015 | Johnson | H04L 67/34 709/203 |
| 2015/0138142 A1* | 5/2015 | Liao | G06F 3/0488 345/174 |
| 2015/0145792 A1* | 5/2015 | Chiang | G06F 3/0416 345/173 |
| 2015/0149347 A1* | 5/2015 | Liu | G06Q 20/204 705/39 |
| 2015/0153860 A1* | 6/2015 | Chiang | G06F 3/0416 345/173 |
| 2015/0155916 A1* | 6/2015 | Kuo | G06F 3/041 455/41.1 |
| 2015/0173116 A1* | 6/2015 | Chiang | G06F 3/0488 455/41.1 |
| 2015/0317032 A1* | 11/2015 | Lin | G06F 3/041 345/174 |
| 2015/0355708 A1* | 12/2015 | Lee | G06F 3/041 345/173 |

\* cited by examiner

SIGNATURE VERIFICATION BETWEEN A MOBILE DEVICE AND A COMPUTING DEVICE

CROSS REFERENCE TO RELATED APPLICATIONS

This application claims priority of U.S. Provisional Application No. 61/918,768, filed on Dec. 20, 2013, the entirety of which is incorporated by reference herein.

BACKGROUND OF THE INVENTION

Field of the Invention

The invention generally relates to security control techniques, and more particularly, to security control by signature verification between two touch-sensitive devices using transmitting and receiving electrodes as the communication medium.

Description of the Related Art

With rapid developments of ubiquitous computing and networking, daily errands, such as distance education, electronic commerce, social networking, online gaming, and household registration, may be easily accomplished by online transactions. Despite the convenience, a user is inevitably required to register a respective account and password for each service website or device as the key to gain access thereto. Unfortunately, the user may be forced to setup multiple accounts and passwords for different service websites or devices due to that each service website or device may have its own rules for defining an account and password, or that the habitual account and/or password of the user is already taken in some service websites or devices. Thus, as the number of accounts and passwords increases, the management of multiple accounts and passwords has become a heavy burden for users.

For security controls over devices, one of the most common solutions is for users to memorize their own accounts and passwords, which is highly unreliable and inefficient. Alternatively, there are other authentication methods which do not require any account and password, such as fingerprint identification, speech recognition, and face identification. For security controls over service websites, one of the most common solutions is to allow browser to save the inputted accounts and passwords automatically. However, the security level provided by the solution is low since anyone who has access to the device can use the account and password through the browser. Not to mention that, the solution lacks portability due to the account and password being saved only in the device.

Thus, it is desirable to have a security control method which not only blocks unauthorized access but also eliminates the burden of managing accounts and passwords for users.

BRIEF SUMMARY OF THE INVENTION

To an increasing extent, various mobile devices, such as smartphones, panel Personal Computers (PCs), multimedia players, and handheld gaming consoles, have been developed for the need of mobile computing and entertaining. In particularly, most mobile devices are equipped with touch panels for providing more intuitive and convenient user interfaces. As touch-based user interfaces grow in popularity, even terminal devices, such as desktop PCs, notebook PCs, automated teller machines (ATMs), and information kiosks, are mounted with touch panels. In order to solve the aforementioned problems, the invention proposes signature verification methods for communicating signature information between two touch-sensitive devices using their respective touch panels as the communication mediums.

In a first aspect of the invention, a non-transitory computer readable storage medium is provided. The non-transitory computer readable storage medium has stored therein instructions, which when executed by a mobile device, cause the mobile device to: provide, at a processing circuit, a signal to a transmitting electrode of a first touch panel; transmit, at the transmitting electrode, the signal to a receiving electrode of a second touch panel of a computing device; and perform further operation with the computing device when the signal corresponds to a signature stored in the computing device.

In a second aspect of the invention, another non-transitory computer readable storage medium is provided. The non-transitory computer readable storage medium has stored therein instructions, which when executed by a computing device, cause the computing device to: receive, at a receiving electrode of a first touch panel, a signal from a transmitting electrode of a second touch panel of a mobile device; receive, at a processing circuit, the signal from the receiving electrode of the first touch panel; generate, at the processing circuit, received data according to the signal; determine, at a processor, whether the received data corresponds to a signature stored in a memory; and generate, at the processor, an authentication signal when determining that the received data corresponds to the signature stored in the memory.

In a third aspect of the invention, a mobile device is provided. The mobile device comprises a first touch panel with a transmitting electrode, and a processing circuit. The transmitting electrode is configured to transmit a signal to a receiving electrode of a second touch panel of a computing device. The processing circuit is configured to provide the signal to the transmitting electrode. When the signal corresponds to a signature stored in the computing device, the mobile device performs further operation with the computing device.

In a fourth aspect of the invention, a computing device is provided. The computing device comprises a memory; a first touch panel with a receiving electrode, a processing circuit, and a processor. The receiving electrode is configured to receive a signal from a transmitting electrode of a second touch panel of a mobile device. The processing circuit is configured to receive the signal from the receiving electrode and generate received data according to the signal. The processor determines whether the received data corresponds to a signature stored in the memory, and generates an authentication signal when determining that the received data corresponds to the signature.

Other aspects and features of the present invention will become apparent to those with ordinary skill in the art upon review of the following descriptions of specific embodiments of the non-transitory computer readable storage mediums, mobile device, and computing device for carrying out the signature-verification method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
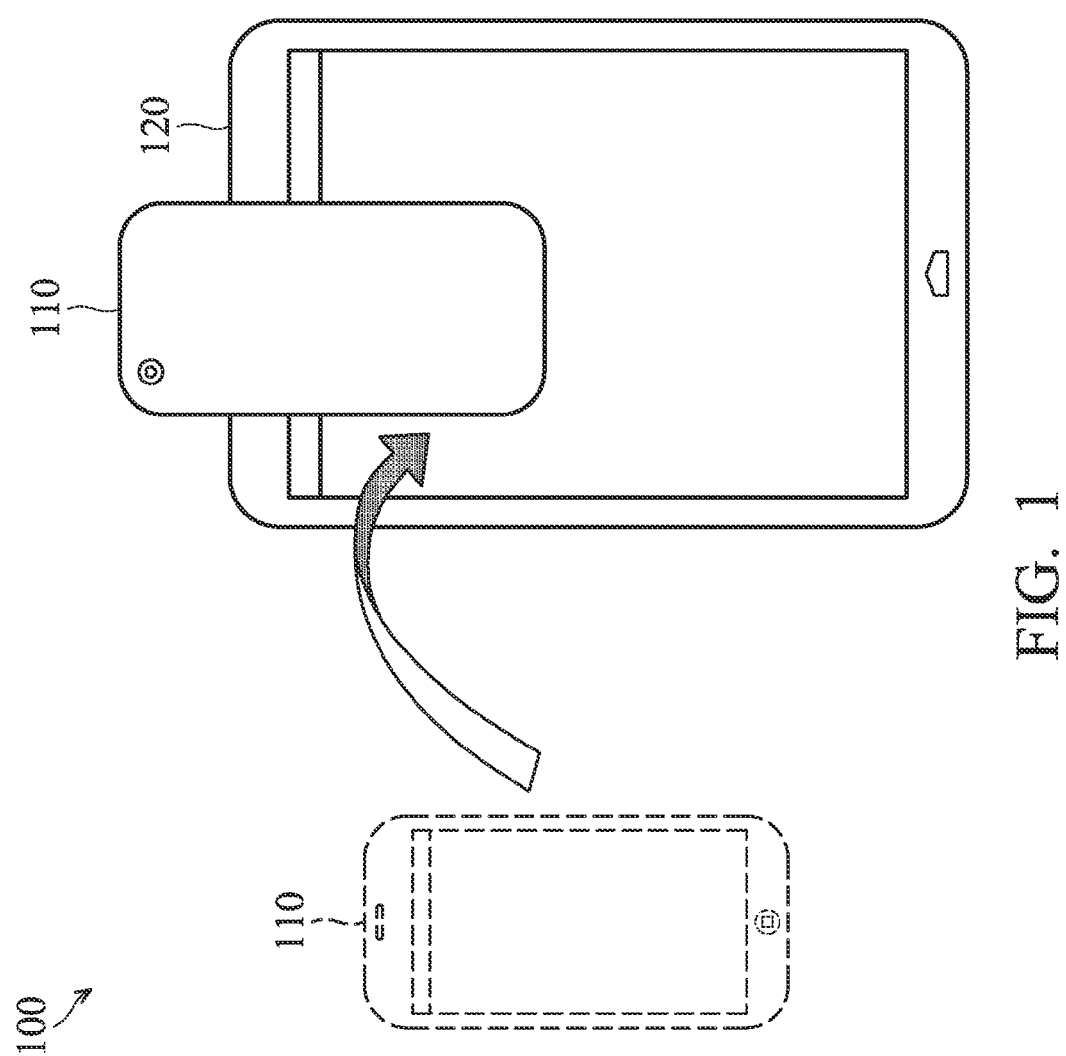
FIG. 1 is a schematic diagram of a signature-verification system according to an embodiment of the invention.

FIG. 1 is a schematic diagram of a signature-verification system according to an embodiment of the invention. The signature-verification system 100 comprises two touch-sensitive devices, i.e., the mobile device 110 and the computing device 120, wherein the mobile device 110 may be a mobile phone, a smartphone, a Portable Media Player (PMP), a handheld gaming console, or a smart accessory (e.g., smart watch or smart glass), and the computing device 120 may be a panel PC, a notebook, a desktop computer, a tablet, an All-In-One (AIO) computer, an Automatic Teller Machine (ATM), or an information kiosk. Each of the mobile device 110 and the computing device 120 is equipped with a touch panel for providing a touch-based user interface which can detect and respond to contacts of a user. In addition, when their touch panels approaches to each other, the mobile device 110 can be configured to transmit signals to the computing device 120 via the transmitting electrode(s) and receiving electrode(s) of their touch panels based on the touch link technology. As shown in FIG. 1, the mobile device 110 is turned over and moved to the computing device 120, so that their touch panels face each other in proximity or contact with each other.

The touch link technology provides near field wireless communication via the touch panel. Generally, a touch panel may include a plurality of driving electrodes and a plurality of sensing electrodes on a substrate. When providing the touch-sensing functionality, the driving electrodes and sensing electrodes may generate a signal in response to an approximation or a contact of an object, such as user's finger or a stylus, and the signal may be processed and calculated to derive the position of the detected approximation or contact of the object. When providing the touch-link functionality, at least one of the driving electrodes and the sensing electrodes may act as transmitting electrode(s) for transmitting signals to another touch-sensitive device by electric field coupling, and at least one of the driving electrodes and the sensing electrodes may act as receiving electrode(s) for receiving signals from another touch-sensitive device by electric field coupling. Therefore, the signals can be transmitted and received by using the original electrodes of the touch panel to realize touch transmission through electric field coupling without an inductive card reader or components with a similar function being incorporated.

When compared to the conventional Near Field Communication (NFC) technology, the touch link technology reduces both volume and cost. This is because some of the existing hardware may be reused. For system developers, the additional effort may be some software and/or firmware revision and porting, so as to enable the existing hardware to support the touch link technology. For example, a protocol may be needed when using the touch link technology to transmit and/or receive data, and related software may need to be modified to implement the protocol. Alternatively, the touch link technology may be provided by using an additional touch panel and other signal processing circuits, instead of using the existing hardware, such as the existing touch panel. In addition, there are two common types of touch panel for providing the touch-sensing functionality, including the capacitive type and resistive type, and both the capacitive type and resistive type of touch panel can be used to realize the touch link technology.

Figure 2:
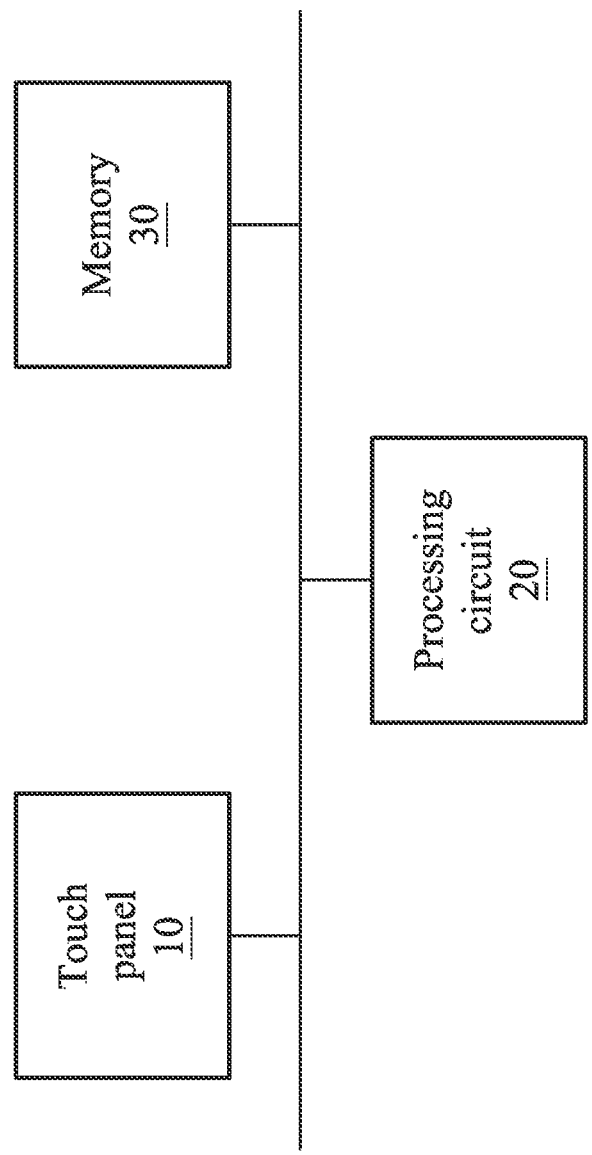
FIG. 2 is a block diagram illustrating the functional units of the mobile device 110 according to an embodiment of the invention.

FIG. 2 is a block diagram illustrating the functional units of the mobile device 110 according to an embodiment of the invention. The mobile device 110 comprises a touch panel 10, a processing circuit 20, and a memory 30. The touch panel 10 may include a display device, such as a Liquid-Crystal Display (LCD), a Light-Emitting Diode (LED), or an Electronic Paper Display (EPD), for providing the display function. In order to provide the touch-sensing functionality, the touch panel 10 further includes one or more driving electrodes and sensing electrodes for detecting contact or proximity of objects (e.g., a finger or touch pen) thereon, thereby providing a touch-based user interface. Moreover, in order to provide the touch link functionality, at least one of the driving electrodes and the sensing electrodes may be configured to act as transmitting electrode(s) for transmitting signals to another touch-sensitive device by electric field coupling, and at least one of the driving electrodes and the sensing electrodes may be configured to act as receiving electrode(s) for receiving signals from another touch-sensitive device by electric field coupling, so that the mobile device 110 can exchange data with another touch-sensitive device, e.g., the computing device 120, via the transmitting electrode(s) and receiving electrode(s). In one embodiment, the touch panel 10 may be implemented with Indium Tin Oxide (ITO) materials.

The processing circuit 20 may be an Integrated Circuit (IC) which provides two main functions. One of the main functions is to perform Analog-to-Digital Conversion (ADC), demodulation, and/or other signal processing procedures on the analog signals received from the touch panel 10, and then store the processed signals in the memory 30 or transmit the processed signals to another touch-sensitive device, e.g., the computing device 120, via the transmitting electrode(s) and receiving electrode(s) of the touch panel 10. Another one of the main functions is to retrieve digital signals from the memory 30, perform modulation, Digital-to-Analog Conversion (DAC), and/or other signal processing procedures on the retrieved digital signals, and then transmit the processed signals to another touch-sensitive device, e.g., the computing device 120, via the transmitting electrode(s) and receiving electrode(s) of the touch panel 10.

The memory 30 may be a non-volatile memory, such as a Flash memory, or may be a volatile memory, such as a Random Access Memory (RAM) or buffer, or any combination thereof for storing processed signals and/or data, such as instructions, user signature, and program codes.

Although not shown, the mobile device 110 may further comprise other functional units, such as a wireless communication module for wireless communications, and/or an Input/Output (I/O) device, e.g., button, keyboard, or mouse, etc., and the invention is not limited thereto. For example, if the mobile device 110 is a mobile/smart phone with wireless communication capability, the mobile device 110 may comprise a wireless communication module which includes a Radio Frequency (RF) unit and a Baseband unit. Specifically, the Baseband unit may contain multiple hardware devices to perform baseband signal processing, including ADC/DAC, gain adjusting, modulation/demodulation, encoding/decoding, and so on, while the RF unit may receive RF wireless signals, convert the received RF wireless signals to baseband signals, which are processed by the Baseband unit, or receive baseband signals from the baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless communications system, wherein the radio frequency may be 2.4 GHz or 5 GHz utilized in the Wireless-Fidelity (WiFi) technology, or may be 2.402~2.480 GHz utilized in the Bluetooth technology, or others depending on the wireless technology in use.

In addition, the mobile device 110 may further comprise a general-purpose processor, such as a Central Processing Unit (CPU) or a Micro-Control Unit (MCU), which provides the function of data processing and computing, and loads and executes a series of instructions and/or program codes from the memory 30 or another non-transitory computer readable storage medium, to control the operation of the touch panel 10 and the processing circuit 20, and to perform the signature-verification method of the invention, including performing further operation with the computing device 120 when the signal that is transmitted by the touch panel 10 to the computing device 120 corresponds to a signature stored in the computing device 120.

Figure 3:
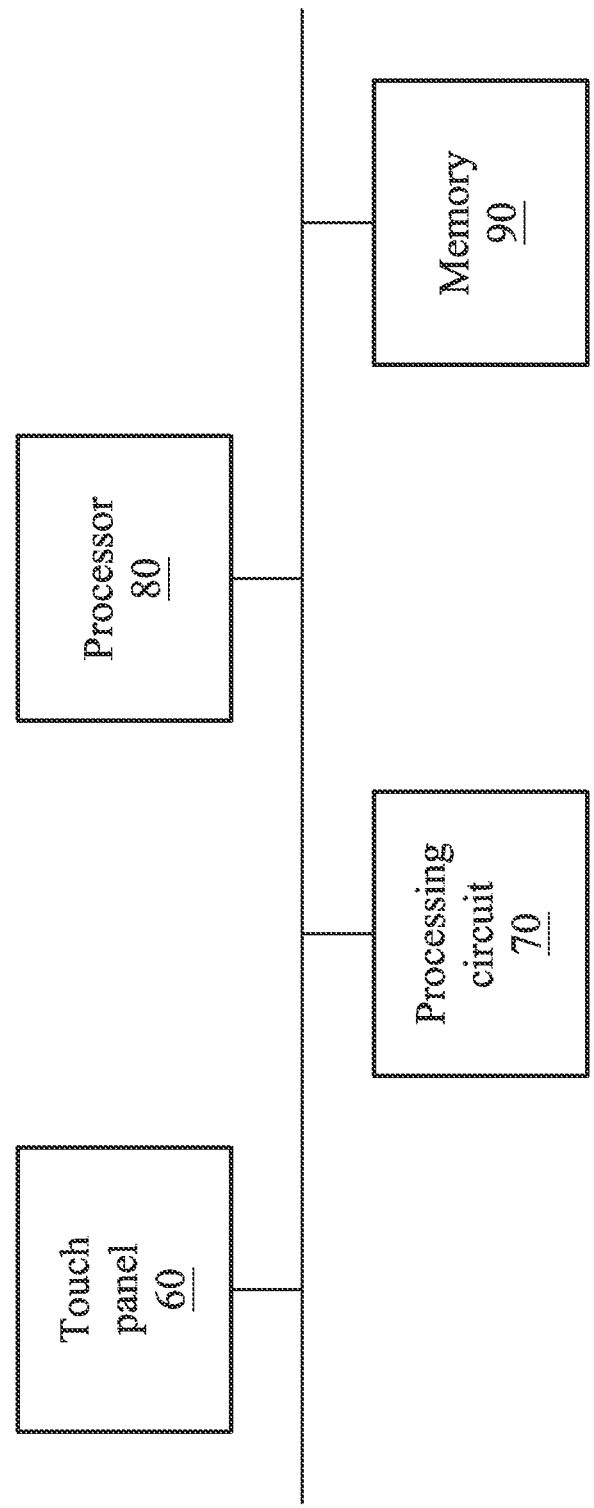
FIG. 3 is a block diagram illustrating the functional units of the computing device 120 according to an embodiment of the invention.

FIG. 3 is a block diagram illustrating the functional units of the computing device 120 according to an embodiment of the invention. The computing device 120 comprises a touch panel 60, a processing circuit 70, a processor 80, and a memory 90. Similar to the touch panel 10, the touch panel 60 also comprises a display device for providing the display functionality, and one or more driving electrodes and sensing electrodes for providing the touch-sensing functionality, wherein the driving electrodes and sensing electrodes may further be configured to act as transmitting electrodes and receiving electrodes for providing the touch link functionality. Specifically, the signal transmission and reception using the touch link technology are performed by electric field coupling between the transmitting electrode(s) of one touch-sensitive device and the receiving electrode(s) of another touch-sensitive device. That is, the computing device 120 can exchange data with another touch-sensitive device, e.g., the mobile device 110, via the transmitting electrode(s) and receiving electrode(s). In one embodiment, the touch panel 60 may be implemented by ITO materials.

The processing circuit 70 may be an IC which provides two main functions. One of the main functions is to perform ADC, demodulation, and/or other signal processing procedures on the analog signals received from the touch panel 60 to generate processed data, and then transmit the processed data to the processor 80. Another one of the main functions is to receive digital signals from the processor 80, perform modulation, DAC, and/or other signal processing procedures on the received digital signals, and then transmit the processed signals to another touch-sensitive device, e.g., the computing device 120, via the transmitting electrode(s) and receiving electrode(s) of the touch panel 60.

The processor 80 may be a general-purpose processor (e.g., a Central Processing Unit (CPU) or a Micro-Control Unit (MCU)), a Digital Signal Processor (DSP), or another type of processor, which provides the function of data processing and computing. Alternatively, the processor 80 may be a controller of a touch IC (e.g., the processing circuit 70), or a controller of a sensor hub incorporating all sensing units. Specifically, the processor 80 may load and execute a series of instructions and/or program codes from the memory 90 or another non-transitory computer readable storage medium, to control the operation of the touch panel 60 and the processing circuit 70, and to perform the signature-verification method of the invention, including determining whether the data received from the processing circuit 70 corresponds to a signature stored in the memory 90, and generating an authentication signal when determining that the received data corresponds to the signature.

The memory 90 may be a non-volatile memory, such as a Flash memory, or may be a volatile memory, such as a RAM or buffer, or any combination thereof for storing processed signals and/or data, such as signature information.

Figure 4:
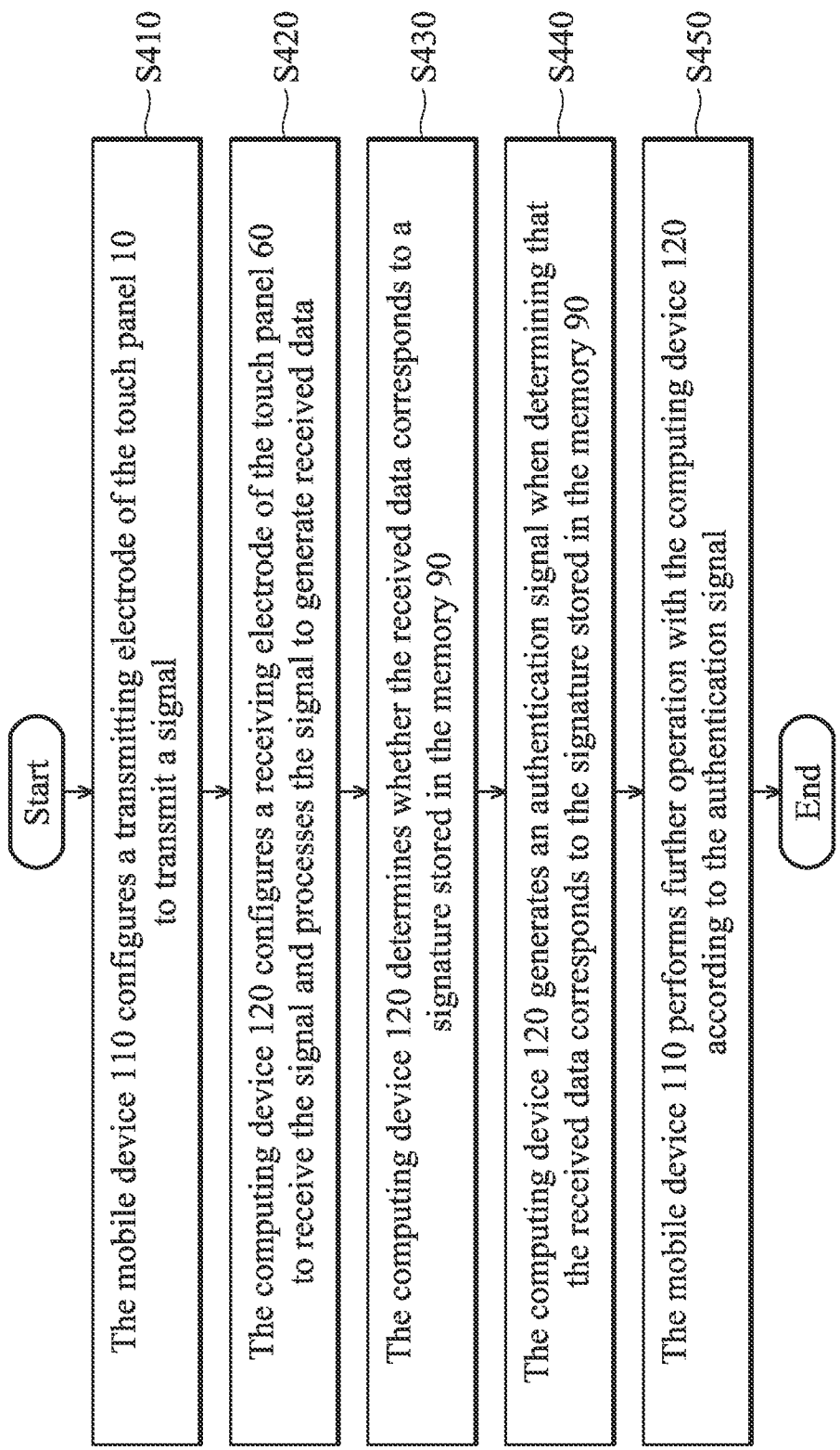
FIG. 4 is a flow chart of the signature-verification method according to an embodiment of the invention.

FIG. 4 is a flow chart of the signature-verification method according to an embodiment of the invention. In this embodiment, the signature-verification method is applied to the signature-verification system 100 which includes the mobile device 110 and the computing device 120, wherein each of the mobile device 110 and the computing device 120 comprises a respective touch panel, i.e., the touch panels 10 and 60. To begin with, the mobile device 110 configures one or more transmitting electrodes of the touch panel 10 to transmit a signal (step S410). Specifically, the signal is transmitted in one or several predetermined frequencies for use in the touch link technology.

Next, the computing device 120 configures one or more receiving electrodes of the touch panel 60 to receive the signal, and processes the signal to generate received data (step S420). That is, the touch panels 10 and 60 are in contact or in proximity with each other, so that the signal may be transmitted from the touch panel 10 to the touch panel 60 through electric filed coupling between the transmitting electrode of the touch panel 10 and the receiving electrode of the touch panel 60.

In one embodiment, the mobile device 110 is served as a touch pen being moved by a user to sign on the touch panel 60 of the computing device 120. As the mobile device 110 is moved by the user during the signing process, the track of the position where the signal is received at the touch panel 60 may correspond to the inputted signature. For example, the mobile device 110 is a mobile phone and the computing device 120 is a desktop computer, wherein the touch panel 60 of the computing device 120 is generally larger than the touch panel 10 of the mobile device 110. Let's say the touch panel 10 has four transmitting electrodes in the horizontal aspect and four transmitting electrodes in the vertical aspect, and thus, the signal transmission from the touch panel 10 forms a two-dimensional (2D) plane and the computing device 120 may process the signal to calculate the moving track of the 2D plane.

In another embodiment, besides moving the mobile device 110 like a touch pen to sign on the computing device 120, one may directly put mobile device 110 in contact or in proximity with the computing device 120, to enable the signature stored in the mobile device 110 to be directly transmitted to the computing device 120. Specifically, the signal is generated according to the signature stored in several data formats in the memory 30 of the mobile device 110.

Figure 5:
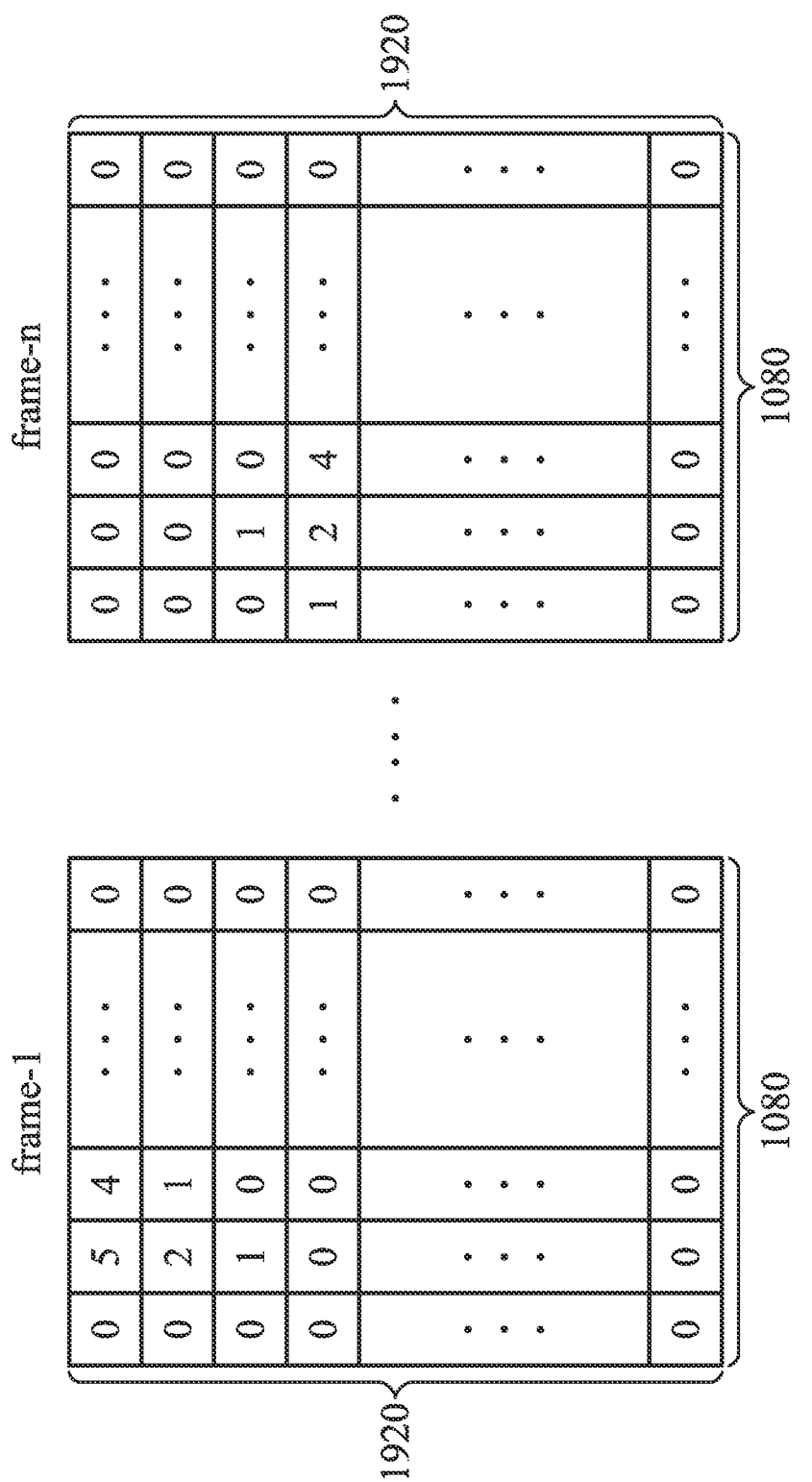
FIG. 5 is a schematic diagram of a plurality of frames according to an embodiment of the invention.

For example, the pre-stored signature may be stored as a plurality of frames, wherein each of the frames is a representative of touch strengths sensed by sensing pixels of the touch panel 10 of the mobile device 121 at a time instant. Specifically, each sensing pixel may be referred to as a sensing cell that is formed by at least a receiving electrode of the touch panel 10. That is, the arrangement of the receiving electrodes of the capacitive touch panel may be seen as a sensing pixel resolution, and each sensing pixel corresponds to the arranged position of a respective receiving electrode, wherein the content of a sensing pixel is the touch data generated by the corresponding receiving electrode. FIG. 5 is a schematic diagram of the pre-stored signature in the format of a plurality of frames according to an embodiment of the invention. As shown in FIG. 5, there are n frames, each frame is generated at a respective time instant, and the sensing pixel resolution of each frame is 1080*1920, i.e., each frame has 1080*1920 sensing pixels. The value stored in each sensing pixel may indicate the sensed strength.

As another example, the pre-stored signature may be stored as a plurality of data sets, wherein each of the data sets comprises a 2D or three-dimensional (3D) coordinate and a time instant. The 2D coordinate is a representative of a position at which the touch panel 10 was touched at the time instant, and the 3D coordinate is a representative of a position at which the touch panel 10 was touched at the time instant and the strength sensed at the position at the same time instant. An exemplary data set comprising a 2D coordinate may be denoted as: (x, y, t), wherein the parameters x and y are the 2D coordinates and the parameter t is the time instant where a touch is sensed. An exemplary data set comprising a 3D coordinate may be denoted as: (x, y, s, t), wherein the parameters x, y, and s are the 3D coordinate with s representing the touch strength corresponding to the position of (x, y) and the parameter t is the time instant where a touch is sensed. In practice, when a user touches a particular position on a touch panel, more than one sensing pixels may sense such a touch event with different touch strengths, with the sensing pixels around the center of the user finger having larger touch strengths. This information may be altogether computed to get one averaged coordinate and one averaged strength so that in a time instant t1, a corresponding 2D position (x1, y1) as well as a touch strength s1 may be obtained.

Subsequent to step S420, the computing device 120 determines whether the received data corresponds to a signature stored in the memory 90 (step S430), and generates an authentication signal when determining that the received data corresponds to the signature stored in the memory 90 (step S440).

Specifically, the computing device 120 determines whether the inputted signature matches with the stored signature (i.e., whether the received data corresponds to the signature stored in the memory 90) according to signature characteristics, such as stroke speed, stroke strength, stroke order, stroke curvature, and/or stroke track of the inputted signature and the stored signature. For example, the computing device 120 may determine a first correlation between the stroke speeds of the inputted signature and the stored signature, a second correlation between the stroke strengths of the inputted signature and the stored signature, a third correlation between the stroke orders of the inputted signature and the stored signature, a fourth correlation between the stroke curvature of the inputted signature and the stored signature, and a fifth correlation between the stroke tracks of the inputted signature and the stored signature. Later, the computing device 120 may calculate a statistical value (e.g., a weighted sum) of the first, second, third, fourth, and fifth correlations, and if the statistical value is greater than a predetermined threshold, it is determined that the inputted signature matches with the stored signature. In regard to the fact that the user may not input exactly the same signature every time, the setting of the predetermined threshold may be set to tolerate a limited range of lapse for the user to input the signature, so that flexibility of signature recognition may be provided while maintaining security control of the computing device 120.

Meanwhile, the mobile device 110 performs further operation with the computing device 120 according to the authentication signal (step S450). As one example, consider the authentication signal to be a 1 bit signal. When it is set to 1'b1, the mobile device 110 performs further operation with the computing device 120; when it is set to 1'b0, the mobile device 110 does not perform further operation with the computing device 120.

In one embodiment, the further operation in step S450 may refer to the computing device 120 entering an unlocked mode or acknowledging the mobile device 110. For example, the computing device 120 was locked initially, and is unlocked only when the authentication signal indicates that the received data corresponds to the signature stored in the memory 90. Alternatively, the computing device 120 may consider the mobile device 110 as an invalid or unauthorized device when the authentication signal indicates that the received data does not correspond to the signature stored in the memory 90, and acknowledges the mobile device 110 as valid or authorized when the authentication signal indicates that the received data corresponds to the signature stored in the memory 90.

In another embodiment, the further operation in step S450 may refer to the computing device 120 enabling communication with the mobile device 110 using a wireless communication technology or launching an Application (APP), when the authentication signal indicates that the received data corresponds to the signature stored in the memory 90. For example, the communication may be data exchange between the mobile device 110 and the computing device 120 using a wireless communication technology, such as the WiFi technology or the Bluetooth technology, that can provide a higher transceiving rate than the touch link technology, thereby improving the transceiving efficiency for subsequent data communication.

Please note that, both the signatures stored in the memory 30 or 90 may include one or more numbers, characters, symbols, or patterns, or any combination thereof, and the invention is not limited thereto.

While the invention has been described by way of example and in terms of preferred embodiment, it is to be understood that the invention is not limited thereto. Those who are skilled in this technology can still make various alterations and modifications without departing from the scope and spirit of this invention.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A non-transitory computer readable storage medium having stored therein instructions, which when executed by a mobile device, cause the mobile device to:
   provide, at a processing circuit, a signal to a transmitting electrode of a first touch panel;
   transmit, at the transmitting electrode, the signal directly to a receiving electrode of a second touch panel of a computing device responsive to the first touch panel and the second touch panel approaching each other; and
   perform further operation with the computing device when the signal corresponds to a handwritten signature stored in the computing device;
   wherein the signal is generated according to another handwritten signature stored in a format in a memory, wherein the format comprises one of the following:
   a plurality of frames, wherein one of the plurality of frames is representative of a plurality of touch strengths sensed by a plurality of sensing pixels of the first touch panel at a first time instant;
   a plurality of first data sets, wherein one of the plurality of first data sets comprises a two-dimensional (2D) coordinate and a second time instant, and the 2D coordinate is representative of a 2D position at which the first touch panel was touched at the second time instant;
   a plurality of second data sets, wherein one of the plurality of second data sets comprises a three-dimensional (3D) coordinate and a third time instant, and the 3D coordinate is representative of another 2D position at which the first touch panel was touched at the third time instant and a touch strength sensed at the another 2D position at the third time instant.

2. The non-transitory computer readable storage medium of claim 1, wherein the further operation with the computing device comprises:
   transmit data, at a wireless communication device other than the first touch panel, to the computing device.

3. The non-transitory computer readable storage medium of claim 1, wherein the computing device is unlocked when the signal corresponds to the handwritten signature stored in the computing device so as to enable the mobile device to perform the further operation with the computing device.

4. A non-transitory computer readable storage medium having stored therein instructions, which when executed by a computing device, cause the computing device to:
   receive, at a receiving electrode of a first touch panel, a signal directly from a transmitting electrode of a second touch panel of a mobile device responsive to the first touch panel and the second touch panel approaching each other;
   receive, at a processing circuit, the signal from the receiving electrode of the first touch panel;
   generate, at the processing circuit, received data according to the signal;
   determine, at a processor, whether the received data corresponds to a handwritten signature stored in a memory; and
   generate, at the processor, an authentication signal when determining that the received data corresponds to the handwritten signature stored in the memory;
   wherein the signal is generated by the mobile device according to another handwritten signature stored in a format in the mobile device, wherein the format is one of the following:
   a plurality of frames, wherein one of the plurality of frames is representative of a plurality of touch strengths sensed by a plurality of sensing pixels of the first touch panel at a first time instant;
   a plurality of first data sets, wherein one of the plurality of first data sets comprises a two-dimensional (2D) coordinate and a second time instant, and the 2D coordinate is representative of a 2D position at which the first touch panel was touched at the second time instant;
   a plurality of second data sets, wherein one of the plurality of second data sets comprises a three-dimensional (3D) coordinate and a third time instant, and the 3D coordinate is representative of another 2D position at which the first touch panel was touched at the third time instant and a touch strength sensed at the another 2D position at the third time instant.

5. The non-transitory computer readable storage medium of claim 4, wherein the processor determines whether the received data corresponds to the handwritten signature stored in the memory according to one of the following:
   stroke speed of the handwritten signature;
   stroke strength of the handwritten signature;
   stroke order of the handwritten signature;
   stroke track of the handwritten signature; and
   stroke curvature of the handwritten signature.

6. The non-transitory computer readable storage medium of claim 4, further causing the computing device to:
   transmit data, at a wireless communication device other than the first touch panel, to the mobile device after the authentication signal is generated.

7. A mobile device, comprising:
   a memory;
   a first touch panel with a transmitting electrode, wherein the transmitting electrode is configured to transmit a signal directly to a receiving electrode of a second touch panel of a computing device responsive to the first touch panel and the second touch panel approaching each other; and
   a processing circuit, configured to provide the signal to the transmitting electrode in response to contact of a user,
   wherein, when the signal corresponds to a handwritten signature stored in the computing device, the mobile device performs further operation with the computing device; and
   wherein the signal is generated according to another handwritten signature stored in a format in the memory, wherein the format comprises one of the following:
   a plurality of frames, wherein one of the plurality of frames is representative of a plurality of touch strengths sensed by a plurality of sensing pixels of the first touch panel at a first time instant;
   a plurality of first data sets, wherein one of the plurality of first data sets comprises a two-dimensional (2D) coordinate and a second time instant, and the 2D coordinate is representative of a 2D position at which the first touch panel was touched at the second time instant; and
   a plurality of second data sets, wherein one of the plurality of second data sets comprises a three-dimensional (3D) coordinate and a third time instant, and the 3D coordinate is representative of another 2D position at which the first touch panel was touched at the third time instant and a touch strength sensed at the another 2D position at the third time instant.

8. The mobile device of claim 7, further comprising:
a wireless communication device other than the first touch panel, and the further operation comprises transmitting data from the wireless communication module to the computing device.

9. The mobile device of claim 7, wherein the computing device is unlocked when the signal corresponds to the handwritten signature stored in the computing device so as to enable the mobile device to perform the further operation with the computing device.

10. A computing device, comprising:
a memory;
a first touch panel with a receiving electrode, wherein the receiving electrode is configured to receive a signal directly from a transmitting electrode of a second touch panel of a mobile device responsive to the first touch panel and the second touch panel approaching each other;
a processing circuit, configured to receive the signal from the receiving electrode and generate received data according to the signal; and
a processor, determining whether the received data corresponds to a handwritten signature stored in the memory, and generating an authentication signal when determining that the received data corresponds to the handwritten signature;
wherein the signal is generated according to another handwritten signature stored in a format in the mobile device, wherein the format comprises one of the following:
a plurality of frames, wherein one of the plurality of frames is representative of a plurality of touch strengths sensed by a plurality of sensing pixels of the first touch panel at a first time instant;
a plurality of first data sets, wherein one of the plurality of first data sets comprises a two-dimensional (2D) coordinate and a second time instant, and the 2D coordinate is representative of a 2D position at which the first touch panel was touched at the second time instant; and
a plurality of second data sets, wherein one of the plurality of second data sets comprises a three-dimensional (3D) coordinate and a third time instant, and the 3D coordinate is representative of another 2D position at which the first touch panel was touched at the third time instant and a touch strength sensed at the another 2D position at the third time instant.

11. The computing device of claim 10, wherein the processor determines whether the received data corresponds to the handwritten signature stored in the memory according to one of the following:
stroke speed of the handwritten signature;
stroke strength of the handwritten signature;
stroke order of the handwritten signature;
stroke track of the handwritten signature; and
stroke curvature of the handwritten signature.

12. The computing device of claim 10, further comprising:
a wireless communication device other than the first touch panel, configured to transmit data to the mobile device after the authentication signal is generated.

* * * * *